United States Patent
Cho (10) Patent No.: US 8,508,202 B2
(45) Date of Patent: Aug. 13, 2013

(54) MAXIMUM POWER POINT TRACKING CONVERTER

(75) Inventor: Sungchun Cho, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 435 days.

(21) Appl. No.: 12/845,652

(22) Filed: Jul. 28, 2010

(65) Prior Publication Data

US 2011/0134668 A1 Jun. 9, 2011

(30) Foreign Application Priority Data

Dec. 4, 2009 (KR) .................. 10-2009-0119699

(51) Int. Cl.
*G05F 1/40* (2006.01)

(52) U.S. Cl.
USPC .............................. 323/282; 323/285; 363/78

(58) Field of Classification Search
USPC ................. 363/60, 78, 79, 95; 323/207, 282, 323/283, 285, 299, 906; 307/45, 51, 82
See application file for complete search history.

(56) References Cited

U.S. PATENT DOCUMENTS

| | | | |
|---|---|---|---|
| 4,375,662 A | | 3/1983 | Baker |
| 7,087,332 B2 | | 8/2006 | Harris |
| 7,394,237 B2 | | 7/2008 | Chou et al. |
| 8,228,697 B2 | * | 7/2012 | Wagoner .................... 363/95 |
| 2002/0163323 A1 | * | 11/2002 | Kasai et al. ................. 323/284 |
| 2004/0021445 A1 | | 2/2004 | Harris |
| 2008/0122449 A1 | | 5/2008 | Besser et al. |
| 2008/0149167 A1 | | 6/2008 | Liu |
| 2009/0316452 A1 | | 12/2009 | Kim et al. |
| 2010/0002470 A1 | | 1/2010 | Kiamilev et al. |
| 2010/0176773 A1 | | 7/2010 | Capel |
| 2010/0206353 A1 | | 8/2010 | Liu |
| 2010/0207451 A1 | | 8/2010 | Liu |

FOREIGN PATENT DOCUMENTS

| | | |
|---|---|---|
| CA | 2680561 A1 | 8/2008 |
| JP | 56-086029 A | 7/1981 |
| JP | 07-044251 A | 2/1995 |

(Continued)

OTHER PUBLICATIONS

Korean Notice of Allowance issued by KIPO, dated Apr. 22, 2011, corresponding to Korean Patent Application No. 10-2009-0119699, together with Request for Entry.

(Continued)

*Primary Examiner* — Adolf Berhane
*Assistant Examiner* — Yemane Mehari
(74) *Attorney, Agent, or Firm* — Robert E. Bushnell, Esq.

(57) ABSTRACT

A maximum power point tracking (MPPT) converter of a renewable energy storage system for tracking and extracting a maximum power from a renewable energy source to provide the maximum power to a DC link. The MPPT converter includes an MPPT controller changing a controlled variable for maximum power point extraction in proportion to a current slope of the renewable energy source, and an MPPT extractor extracting a maximum power from the renewable energy source and converting the extracted maximum power in response to a control of the MPPT controller. The controlled variable variation is set to a large value if the current slope is out of a predetermined current slope range, and the controlled variable variation is set to a small value if the current slope is within the predetermined current slope range.

20 Claims, 6 Drawing Sheets

(56) References Cited

FOREIGN PATENT DOCUMENTS

| | | |
|---|---|---|
| JP | 08-171430 A | 7/1996 |
| JP | 10031525 | 2/1998 |
| JP | 2001-060120 A | 3/2001 |
| JP | 2002-272094 A | 9/2002 |
| JP | 2005-070890 A | 3/2005 |
| JP | 2008-166690 A | 7/2006 |
| JP | 2007-133643 A | 5/2007 |
| JP | 2009-531762 A | 9/2009 |
| JP | 2009207239 | 9/2009 |
| JP | 2010-518510 A | 5/2010 |
| KR | 1020060087957 | 8/2006 |
| KR | 1020070043746 | 4/2007 |
| KR | 1020070043746 A | 4/2007 |

OTHER PUBLICATIONS

European Search Report issued by European Patent Office, dated Jun. 1, 2011, corresponding to European Patent Application No. 10171937.5-2206.

Jun Youn Ahn, et al.: "Dual-module based maximum power point tracjing control of PV system," 20040222; 20040222-20040226, vol. 3, Feb. 22, 2004, pp. 1509-1514, XP010704038, DOI: DOI: 10.1109/APEC.2004.1296064 ISBN: 978-0-7803-8269-5 *p. 1510-p. 1510; Figures 2-4 which was cited in the European Search Report issued by European Patent Office, dated Jun. 1, 2011, corresponding to European Patent Application No. 10171937.5-2206.

Japanese Office Action dated Jan. 29, 2013 in connection with Japanese Patent Application No. 2010-132393 and Request for Entry of the Accompanying Office Action attached herewith.

\* cited by examiner

MAXIMUM POWER POINT TRACKING CONVERTER

CLAIM OF PRIORITY

This application makes reference to, incorporates into this specification the entire contents of, and claims all benefits accruing under 35 U.S.C. §119 from an application earlier filed in the Korean Intellectual Property Office on Dec. 4, 2009, and there duly assigned Serial No. 10-2009-0119699.

BACKGROUND OF THE INVENTION

1. Field of the Invention

Example embodiments relate to a Maximum Power Point Tracking (MPPT) converter of a renewable energy storage system and an MPPT method.

2. Description of the Related Art

In general, since a renewable energy storage system such as a solar cell or a wind power plant has low power efficiency, it is necessary for a power extractor to control MPPT such that the maximum power can be extracted from a renewable energy source.

SUMMARY OF THE INVENTION

Exemplary embodiments of the present invention provide an improved MPPT converter of a renewable energy storage system and an improved MPPT method.

Exemplary embodiments of the present invention further provide an improved MPPT converter of a renewable energy storage system and an improved MPPT method in which prompt and accurate MPPT is possible by using a current slope of a renewable energy source such as a solar cell.

Exemplary embodiments of the present invention further provide an MPPT converter of a renewable energy storage system and an MPPT method in which prompt and accurate MPPT is possible by setting a controlled variable variation to be relatively large when a current slope of a renewable energy source such as a solar cell is out of a predetermined range.

Exemplary embodiments of the present invention further provide an MPPT converter of a renewable energy storage system and an MPPT method in which prompt and accurate MPPT is possible by setting a controlled variable variation to be relatively small when a current slope of a renewable energy source such as a solar cell is within a predetermined range.

In accordance with an aspect of an embodiment of the present invention, a maximum power point tracking (MPPT) converter of a renewable energy storage system for tracking and extracting a maximum power from a renewable energy source to provide the maximum power to a DC link is provided. The MPPT converter includes an MPPT controller changing a controlled variable for maximum power point extraction in proportion to a current slope of the renewable energy source, and an MPPT extractor extracting a maximum power from the renewable energy source and converting the extracted maximum power in response to a control of the MPPT controller. The controlled variable variation is set to a large value if the current slope is out of a predetermined current slope range and the controlled variable variation is set to a small value if the current slope is within the predetermined current slope range.

The predetermined current slope range may be about ±1% to about ±20% based on a current slope corresponding to a predetermined maximum power point.

The predetermined current slope range may be about ±5% to about ±10% based on a current slope corresponding to a predetermined maximum power point.

The MPPT controller may include a current slope range setting unit setting the predetermined current slope range that is a reference for determining the controlled variable variation, a current slope comparing unit comparing the predetermined current slope of the renewable energy source with the current slope range, and a controlled variable setting unit setting the controlled variable variation to be the small value when the current slope is within the current slope range.

The controlled variable variation may be set to the large value when the current slope is out of the predetermined current slope range.

The MPPT controller may include a power calculating unit calculating a present power using an input voltage and an input current provided from the renewable energy source, and a power comparing unit comparing a present power provided from the power calculating unit with a pre-stored previous power. The controlled variable setting unit sets the controlled variable using an output signal provided from the current slope comparing unit and the power comparing unit.

A Pulse Width Modulation (PWM) controlling unit may be electrically connected to the control variable setting unit. A gate signal generating unit may be electrically connected to the PWM controlling unit. The MPPT extractor is controlled by a gate signal provided by the gate signal generating unit.

The MPPT extractor may be a non-insulating DC-DC converter.

The MPPT extractor may be an insulating DC-DC converter.

The renewable energy may be an energy obtained from a solar cell.

At least one of the above and other features and advantages may be realized by providing an MPPT method of a renewable energy storage system. The method includes sensing an input current and an input voltage provided from a renewable energy source, calculating a current slope from the input current, determining whether the calculated current slope is within a predetermined current slope range or not, setting a controlled variable variation to be a relatively small value when the calculated current slope is within the predetermined current slope range, and setting the controlled variable variation to be a relatively large value when the calculated current slope is out of the predetermined current slope range. The controlled variable variation is used for maximum power extraction from the renewable energy source.

The predetermined current slope range may be about ±1% to about ±20% of a current slope corresponding to a predetermined maximum power point.

The predetermined current slope range may be about ±5% to about ±10% of a current slope corresponding to a predetermined maximum power point.

After the setting of the controlled variable variation to be the relatively large value, the method may further include determining whether a presently sensed current value is equal to or greater than a current value corresponding to a predetermined maximum power point. If the presently sensed current value is equal to or greater than the current value corresponding to the predetermined maximum power point, a present controlled variable may be set by adding the controlled variable variation to a previous controlled variable. If the presently sensed current value is less than the current value corresponding to the predetermined maximum power point, a present controlled variable may be set by subtracting the controlled variable variation from a previous controlled variable.

After the setting of the controlled variable variation to be the relatively small value, the method may further include determining whether the present power is equal to or greater than a previous power. If the present power is equal to or greater than the previous power and a direction of the controlled variable variation is equal to or greater than 0, a present controlled variable may be set by adding the controlled variable variation to a previous controlled variable. If the present power is equal to or greater than the previous power and a direction of the controlled variable variation is less than 0, a present controlled variable may be set by subtracting the controlled variable variation from a previous controlled variable.

After the setting of the controlled variable variation to be relatively small, the method may further include determining whether a present power is equal to or greater than a previous power. If the present power is less than the previous power and a direction of the controlled variable variation is equal to or less than 0, a present controlled variable may be set by subtracting the controlled variable variation from a previous controlled variable. If the present power is less than the previous power and a direction of the controlled variable variation is greater than 0, a present controlled variable may be set by adding the controlled variable variation to a previous controlled variable.

The renewable energy may be an energy obtained from a solar cell.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

For one example, the maximum power point, which is an operating point, that can be used for extracting the maximum power from a solar cell power system may vary greatly depending on solar radiation and surface temperature, and is determined by a load condition. Accordingly, in order to extract the maximum power from the solar cell power system, the operating point needs to be controlled to track the maximum power point. The MPPT extractor that controls the operating point to track the maximum power is very important because it directly influences power generation of the solar cell power system.

Hereinafter, preferred embodiments of the present invention are described in detail with reference to the accompanying drawings such that those skilled in the art can realize the present invention without difficulties.

Here, like reference numerals refer to like components having similar configurations and operations. Additionally, when a portion is electrically connected to another portion, it can be directly connected to the another portion, or a third portion may also be present between the portion and the another portion.

Figure 1:
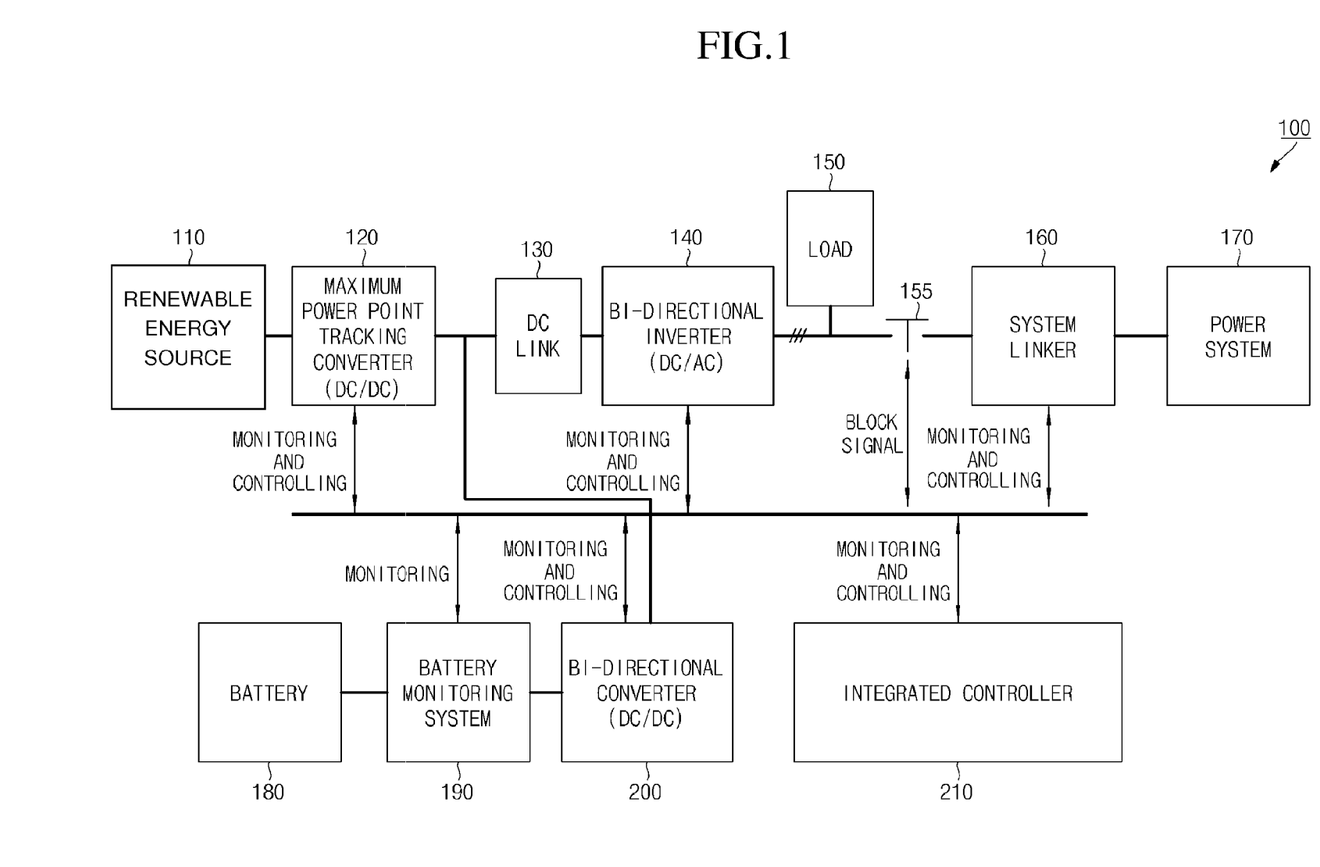
FIG. 1 is a block diagram illustrating a renewable energy storage system constructed as an embodiment according to the principles of the present invention.

FIG. 1 is a block diagram illustrating a renewable energy storage system according to the present invention.

As shown in FIG. 1, a renewable energy storage system 100 includes a renewable energy source 110, a Maximum Power Point Tracking (MPPT) converter 120, a direct current link (DC) 130, a bi-directional inverter 140, a load 150, a system linker 160, a power system 170, a battery 180, a battery monitoring system 190, a bi-directional converter 200, and an integrated controller 210.

Renewable energy source 110 refers to an energy including the sun, wind, water, and the heat of the earth. In more detail, renewable energy source 110 may be an electric power obtained from a solar cell, a wind power generator, and their equivalents. In the description below, the electric power obtained from the solar cell is used as renewable energy source 110.

MPPT converter 120 extracts a maximum power, which is a DC power, from renewable energy source 110 and converts the extracted maximum power into a DC power of another level and outputs it. For example, an output of the solar cell changes non-linearly according to solar radiation and surface temperature. This phenomenon is a main factor for power efficiency deterioration of the solar cell. MPPT converter 120 allows an operating point of the solar cell to always operate at a maximum power point. The operating point changes non-linearly according to the solar radiation amount and the surface temperature of the solar cell. Furthermore, the extracted maximum power is converted into the DC power of another level, and is then provided to DC link 130.

DC link 130 temporarily stores the DC power provided from MPPT converter 120. DC link 130 may be substantially a capacitor having a large capacity. Accordingly, DC link 130 temporarily stores a stable DC power by removing an AC component from the DC power provided from MPPT converter 120. Furthermore, DC link 130 stabilizes the DC power provided from bi-directional inverter 140 or bi-directional converter 200 and then temporarily stores the DC power.

Bi-directional inverter 140 converts the DC power provided from DC link 130 into a commercial AC power and outputs the converted commercial AC power. Substantially, bi-directional inverter 140 converts a DC voltage from renewable energy source 110 or battery 180 into a commercial AC voltage used in home, and then outputs the converted commercial AC voltage. Additionally, bi-directional inverter 140 converts a commercial AC power provided from power system 170 into a DC power and provides the converted DC power into DC link 130. Of course, a power source stored in DC link 130 is provided to battery 180 through bi-directional converter 200.

Load 150 may be home or industrial facilities using a commercial AC voltage. Load 150 receives the commercial AC power from renewable energy source 110, battery 180, or power system 170.

System linker 160 connects bi-directional inverter 140 with power system 170. For example, system linker 160 adjusts a voltage variation range, suppresses a high frequency, and removes a DC component to provide an AC power of bi-directional inverter 140 to power system 170, or provides an AC power of power system 170 to bi-directional inverter 140.

Electric power system 170 is an AC power system provided from an electric power company or a power generating company. For example, electric power system 170 is an electric linkage in a broad area including a power plant, a transformer substation, and a power transmission line. This electric power system 170 may be typically called a grid.

Battery 180 may be a secondary battery that is chargeable and dischargeable. For example, battery 180 may be a lithium ion battery, a lithium polymer battery, and their equivalents, and this does not limit the kinds of battery 180.

Battery monitoring system 190 maintains and manages a state of battery 180 optimally. For example, battery monitoring system 190 monitors a voltage, a current, and a temperature of battery 180 and warns a user when an abnormal situation occurs. Furthermore, battery monitoring system 190 calculates State Of Charge (SOC) and State Of Health (SOH) of battery 180, performs cell balancing to allow a voltage or a capacity of each battery to be equal, and controls a cooling fan (not shown) to prevent an overheating of battery 180.

Bi-directional converter 200 converts a DC power from renewable energy source 110 into a DC power of another level suitable for battery 180. On the contrary, bi-directional converter 200 converts an DC power of battery 180 into a DC power of another level suitable for DC link 130. Bi-directional converter 200 may be a single structure, or may be a non-insulation type or an insulation type.

Integrated controller 210 monitors and controls MPPT converter 120, bi-directional inverter 140, system linker 160, and bi-directional converter 200. Additionally, integrated controller 210 communicates with battery monitoring system 190 for monitoring. Substantially, integrated controller 210 senses a voltage, a current, and a temperature from each of MPPT converter 120, bi-directional inverter 140, system linkage 160, and bi-directional converter 200, and controls MPPT converter 120, bi-directional inverter 140, system linkage 160, and bi-directional converter 200. Furthermore, integrated controller 210 operates a circuit breaker 155 installed between load 150 and system linker 160.

Figure 2:
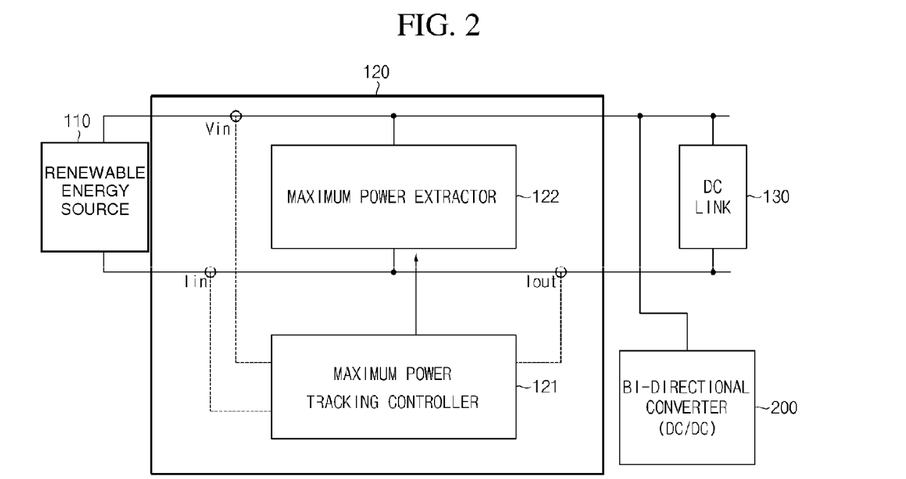
FIG. 2 is a block diagram illustrating an MPPT converter of a renewable energy storage system constructed as one embodiment according to the principles of the present invention.

FIG. 2 is a block diagram illustrating an MPPT converter of a renewable energy storage system constructed as one embodiment according to the principles of the present invention.

As shown in FIG. 2, MPPT converter 120 of the renewable energy storage system is installed between a renewable energy source 110, a DC link 130, and a bi-directional converter 200. MPPT converter 120 tracks a maximum power, which is a DC power, of renewable energy source 110 and converts the tracked DC power into a DC power of another level, and then provides the DC power of the another level to DC link 130 and bi-directional converter 200. Furthermore, MPPT converter 120 includes a maximum power point tracking controller (MPPT controller) 121 and a maximum power point extractor (MPPT extractor) 122.

Maximum power tracking controller 121 substantially senses a voltage and a current from renewable energy source 110. Moreover, MPPT controller 121 calculates a slope of the sensed current (that is, a current slope) and changes a controlled variable for extracting the maximum power to be proportional to the slope of the current. Substantially, MPPT controller 121 sets a controlled variable variation to be relatively large if the slope of the current is out of a predetermined current slope range. Additionally, MPPT controller 121 substantially sets the controlled variable variation to be relatively small if the slope of the current is in the predetermined current slope range. In the present specification and the claims, a current slope refers to a ratio of a current variation divided by a corresponding time variation. In addition, in the present specification and the claims, a controlled variable variation refers to a change of the controlled variable.

In more detail, MPPT controller 121 sets the controlled variable variation to be relatively large if the slope of the current is out of a predetermined current slope range. Therefore, an operating point of renewable energy source 110 can promptly move to around the maximum power point.

In addition, MPPT controller 121 sets the controlled variable variation to be relatively small if the slope of the current is in a predetermined current slope range. Therefore, an operating point of renewable energy source 110 can accurately move to the maximum power point. These operations are described below in more detail.

MPPT extractor 122 extracts the maximum power, which is a DC power, from renewable energy source 110 in response to a control signal of MPPT controller 121 and converts the extracted DC power into a DC power of another level and then provides the DC power of the another level to DC link 130. This MPPT extractor 122 may be a low cost non-insulating DC-DC converter, or an expensive insulating DC-DC converter, but this does not limit the kinds of MPPT 122 in the present invention.

Figure 3:
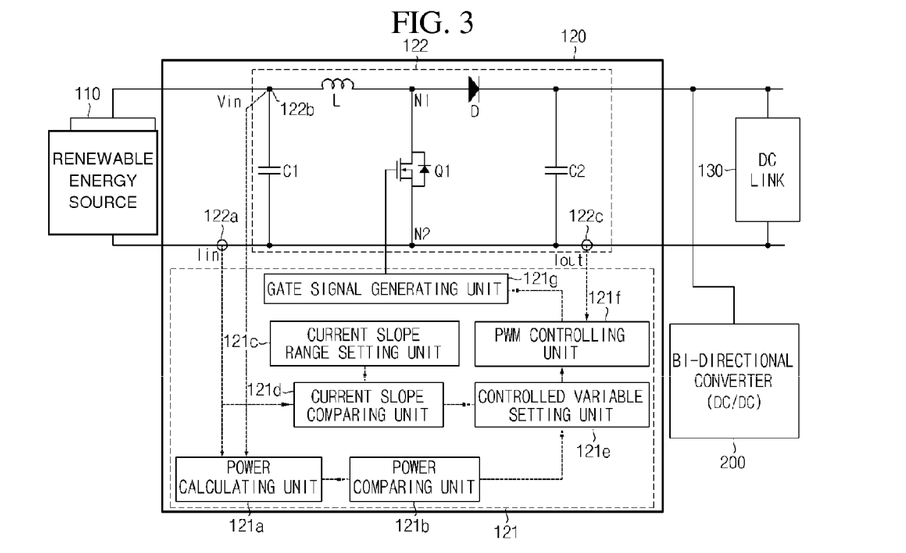
FIG. 3 is a circuit diagram illustrating the MPPT converter of FIG. 2 constructed as an embodiment according to the principles of the present invention.

FIG. 3 is a circuit diagram illustrating a MPPT converter of FIG. 2 constructed as an exemplary embodiment according to the principles of the present invention.

As shown in FIG. 3, MPPT controller 121 includes a power calculating unit 121a, a power comparing unit 121b, a current slope range setting unit 121c, a current slope comparing unit 121d, a controlled variable setting unit 121e, a Pulse Width Modulation (PWM) controlling unit 121f, and a gate signal generating unit 121g. Of course, MPPT controller 121 may further include other components, but only the components related to the present invention is illustrated herein.

Power calculating unit 121a receives an input current value input from renewable energy source 110 through current sensor 122a, and receives an input voltage value from renewable energy source 110 through voltage sensor 122b. Accordingly, power calculating unit 121a calculates a present power value by multiplying the input current value and the input voltage value. Hereinafter, a current, a voltage, and a power refer to the current value, the voltage value, and the power value, respectively.

Power comparing unit 121b stores a previous power and compares the previous power with the calculated present power and then calculates their difference.

In addition, current slop range setting unit 121c, for example, sets and stores a current slope range of about ±1% to about ±10% based on a current slope corresponding to the maximum power point. More preferably, current slop range setting unit 121c sets and stores a current slope range of about ±5% to ± about 10% based on a current slope corresponding to the maximum power point. Of course, the setting of the current slope range is performed by a user. Accordingly, the current slope range may vary according to a device environment.

Current slope comparing unit 121d calculates the slope of a current inputted through current sensor 122a and then determines whether the calculated current slope is within a current slope range stored in current slope range setting unit 121c. For example, current slop comparing unit 121d determines whether the calculated current slope is within a current slope range of about ±1% to ± about 20% based on a current slope corresponding to the predetermined maximum power point. For another example, current slop comparing unit 121d determines whether the calculated current slope is within a current slope range of about ±5% to ± about 10% based on a current slope corresponding to the predetermined maximum power point.

Controlled variable setting unit 121e sets a controlled variable that will be provided to PWM controlling unit 121f using a signal provided from power comparing unit 121b and current slope comparing unit 121d. For example, controlled variable setting unit 121e determines that an operating point of renewable energy source 110 is far from the maximum power point if the current slope is out of the predetermined range, and thus selects a relatively-large controlled variable variation and then outputs the relatively-large controlled variable variation to PWM controlling unit 121f. For another example, controlled variable setting unit 121e determines that an operating point of renewable energy source 110 is close to the maximum power point if the current slope is within the predetermined range, and thus selects a relatively-small controlled variable variation and then outputs the relatively-small controlled variable variation to PWM controlling unit 121f.

PWM controlling unit 121f provides a PWM signal determined by a controlled variable from controlled variable setting unit 121e into gate signal generating unit 121g. Here, the controlled variable provided from controlled variable setting unit 121e may be a duty ratio of a pulse signal for a PWM control. That is, the controlled variable may be a ratio of the amplitude of an outputted sinusoidal wave signal with respect to the amplitude of an inputted carrier signal. Of course, PWM controlling unit 121f is fed back and controlled by an output current $I_{out}$ provided from output current sensor 122c.

Gate signal generating unit 121g provides a gate signal of a predetermined frequency into a gate of a switching transistor Q1 equipped in MPPT extractor 122.

In addition, MPPT extractor 122 may be a low-cost non-insulating DC-DC converter. For example, MPPT extractor 122 includes a first capacitor C1, a diode D, a second capacitor C2, and a switching transistor Q1. First capacitor C1 is connected in parallel to a positive pole and a negative pole of renewable energy source 110 and has a potential difference like a voltage of renewable energy source 110. Inductor L is connected in serial to first capacitor C1 and stores energy. Diode D is connected in series to inductor L and performs a half-wave rectification. Second capacitor C2 is connected in parallel to renewable energy source 110 and removes an AC component. In switching transistor Q1, its drain is connected to a node N1 between inductor L and diode D, its source is connected to a node N2 between first capacitor C1 and second capacitor C2, and its gate is connected to gate signal generating unit 121g. Of course, it is apparent to those skilled in the art that other circuit devices can be more included besides the above-mentioned circuit devices in order to improve maximum power extraction efficiency.

Switching transistor Q1 of MPPT extractor 122 is turned on or off using a signal having a predetermined frequency by provided by MPPT controller 121, that is, a gate signal of gate signal generating unit 121g. Accordingly, the energy of renewable energy source 110 is converted into a DC power of another level through inductor L, diode D, and second capacity C2, and then the converted DC power is delivered into DC link 130 and bi-directional converter 200.

Figure 4:
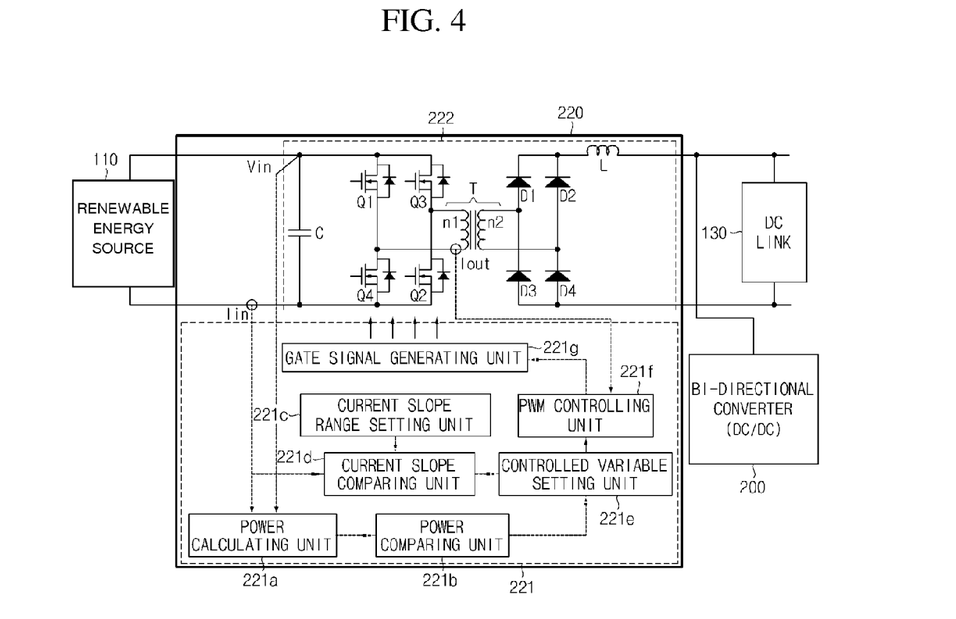
FIG. 4 is a circuit diagram illustrating the MPPT converter of FIG. 2 constructed as another embodiment according to the principles of the present invention.

FIG. 4 is a circuit diagram illustrating a MPPT converter of FIG. 2 constructed as another exemplary embodiment according to the principles of the present invention.

As shown in FIG. 4, MPPT extractor 222 of MPPT converter 220 may be an expensive insulating DC-DC converter. For example, MPPT extractor 222 include a capacitor C, four switching transistors Q1 to Q4, four diodes D1 to D4, a transformer T, and an inductor L. Capacitor C is connected in parallel to the positive pole and the negative pole of renewable energy source 119 and has an electrical potential difference like a voltage of renewable energy source 110. The four switching transistors Q1 to Q4 are connected in parallel to capacitor C and are turned on or off using a signal having a predetermined frequency. The four diodes D1 to D4 are connected in parallel to capacitor C to perform wave rectification. In transformer T, its first winding coil n1 is connected to switching transistors Q1 to Q4, and a second winding wire n2 is connected to the four diodes D1 to D4. Inductor L is connected in series to diodes D1 to D4. Of course, it is apparent to those skilled in the art that other circuit devices can be more included besides the above-mentioned circuit devices in order to improve maximum power extraction efficiency.

Switching transistors Q1 to Q4 of MPPT extractor 222 is turned on or off using a signal having a predetermined frequency provided by MPPT controller 222, that is, a gate signal of gate signal generating unit 221g. Accordingly, energy of renewable energy source 110 is converted into a DC power of another level through inductor L and diode D, and then the converted DC power is delivered into DC link 130 and bi-directional converter 200 again.

Figure 5A:
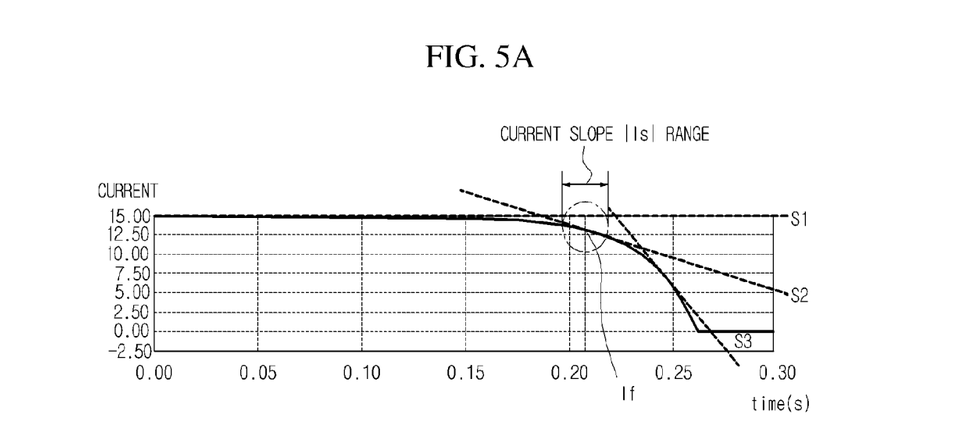
FIGS. 5A through 5C are graphs illustrating characteristic curves about a current, a voltage, and a power of a solar cell, respectively.
Figure 5B:
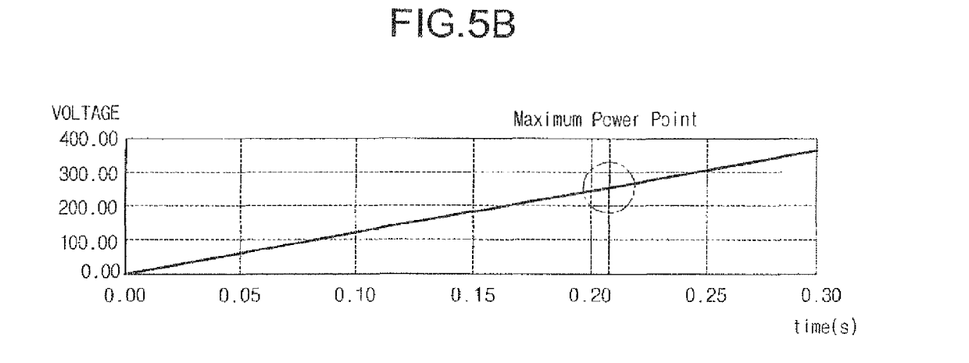
Figure 5C:
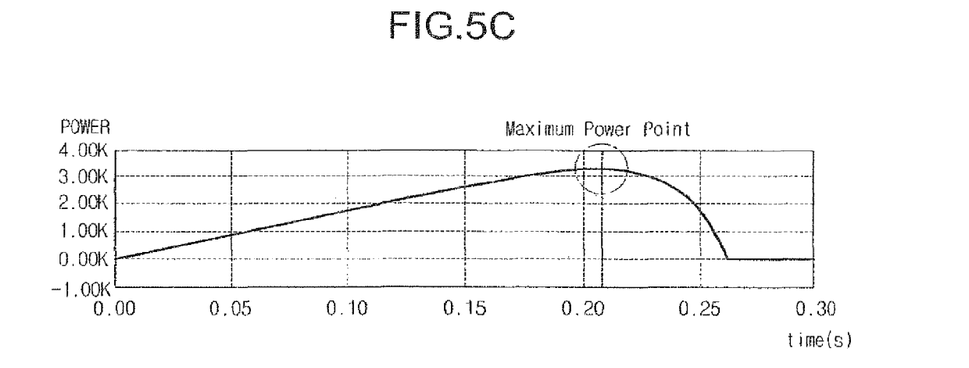

FIGS. 5A through 5C are graphs illustrating the characteristic curves about a current, a voltage, and a power of a solar cell, respectively.

As shown in FIG. 5A, an X axis represents a time measured in seconds (s or sec) and a Y-axis represents a current measured in amperes (A) outputted from a solar cell. Once the solar cell operates, a current (about 15 A) of a predetermined value is outputted first, but the output current of the solar cell gradually decreases as time elapses. That is, when about 0.15 sec passes, an output current of the solar cell is decreased and an output current of the solar cell becomes about 0 A when about 0.27 sec passes.

In addition, S1, S2, and S3 represent current slopes in FIG. 5A. In the present specification and the claims, a current slope refers to a ratio of a current variation divided by a corresponding time variation. Here, current slope 51 is mainly positioned at the left of the graph based on the predetermined current slop $|I_s|$ range. Current slope S2 is mainly positioned inside the predetermined current slope $|I_s|$ range. Current slope S3 is mainly positioned at the right of the graph based on the predetermined current clop $|I_s|$ range. Of course, current slope angles of S1, S2, and S3 increase in the order of S1, S2, and S3. Moreover, as shown in FIG. 5A, $I_f$ means a current corresponding to the maximum power point and current slope range $|I_s|$ is a value set around the maximum power point.

As shown in FIG. 5B, an X axis represents time measured in seconds (s) and a Y-axis represents a voltage measured in volts (V) outputted from a solar cell. Once the solar cell operates, an output voltage of the solar cell gradually increases as time elapses. That is, in the solar cell, an initial output voltage is 0 V and an output voltage becomes about 250 V after about 0.21 sec passes. Additionally, even after about 0.21 sec passes, an output voltage continuously increases.

As shown in FIG. 5C, an X axis represents time measured in seconds (s) and a Y-axis represents a power measured in kilowatt (Kwh) that is the product of a current and a voltage. Once the solar cell operates, a power of the solar cell gradually increases as time passes, and decreases again once the current passes the maximum power point I. That is, in the solar cell, an initial output voltage is about 0 Kwh and the output power becomes about 3100 Kwh after about 0.21 sec passes. Additionally, after about 0.21 sec passes, the output power is continuously decreased.

According to the above-mentioned characteristics of the solar cell, it is known that an operating point of the solar cell needs to correspond to the maximum power point. Especially, it is known that the maximum power cannot be extracted at an interval of the predetermined current slope.

Accordingly, the present invention needs to set a current slope range in advance, which corresponds to the maximum power point. That is, the present invention sets a current slope range of about ±1% to about ±20%, which corresponds to the predetermined maximum power point. More preferably, the present invention sets a current slope range of about ±5% to about ±10%, based on a current slope corresponding to the predetermined maximum power point. Additionally, the present invention defines a current value corresponding to the maximum power point as $I_f$.

As mentioned above, the present invention allows the operating point of the renewable energy source to reach around the maximum power point fast by setting a controlled variable variation to be relatively large for the maximum power point extraction if a current slope is out of the predetermined current slope $|I_s|$ range (e.g., an interval of 0.19 sec to 0.22 sec at the X-axis in FIGS. 5A through 5C, or a neighboring interval of a current slope S2).

Additionally, as mentioned above, the present invention allows the operating point of the renewable energy source to reach around the maximum power point accurately by setting a controlled variable variation to be relatively small for the maximum power point extraction if a current slope is within the predetermined current slope range (e.g., an interval of 0.19 sec to 0.22 sec at the X-axis in FIGS. 5A through 5C, or a neighboring interval of a current slope S2).

Figure 6A:
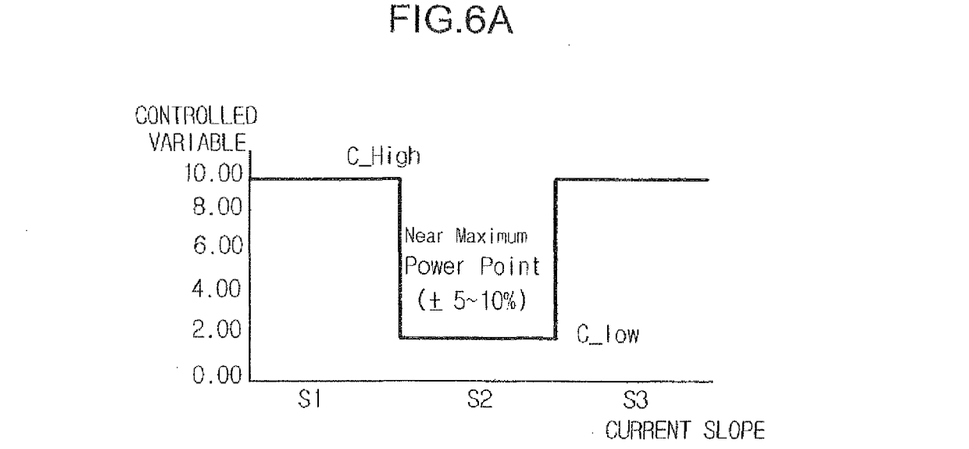
FIG. 6A is a graph illustrating a controlled variable variation determined according to a current slope constructed as an embodiment according to the principles of the present invention.
Figure 6B:
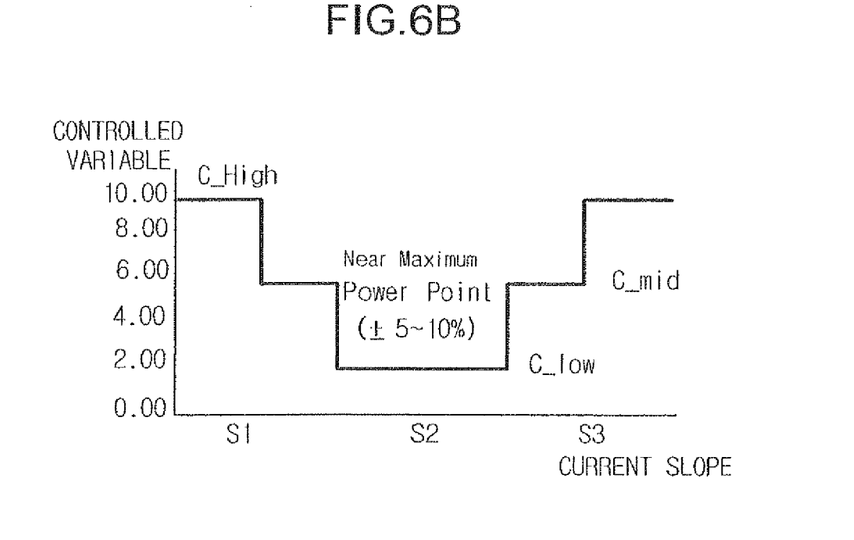
FIG. 6B is a graph illustrating a controlled variable variation determined according to a current slope constructed as another embodiment according to the principles of the present invention.
Figure 6C:
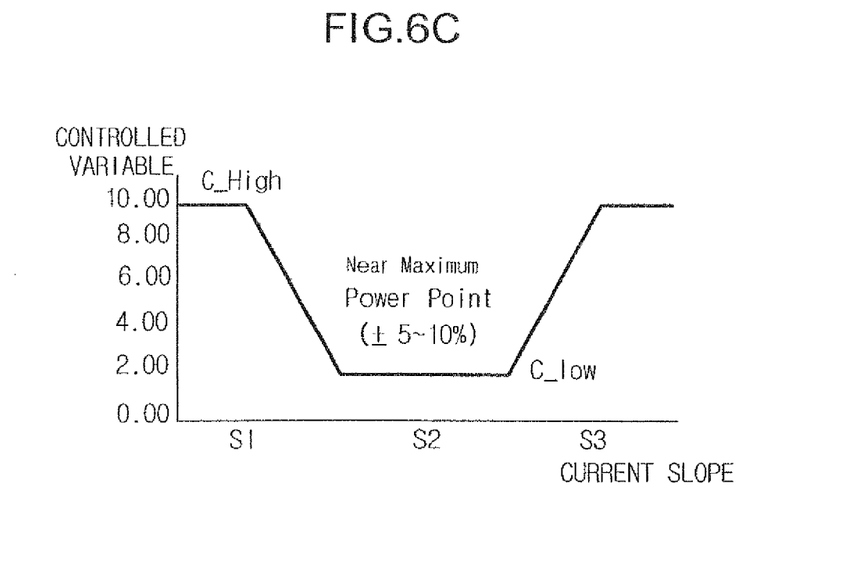
FIG. 6C is a graph illustrating a controlled variable variation determined according to a current slope constructed as still another embodiment according to the principles of the present invention.

FIGS. 6A to 6C are graphs illustrating a controlled variable variation according to a current slope.

In FIGS. 6A through 6C, an X-axis is a current slope, and a Y-axis is a controlled variable variation. Here, the controlled variable variation (i.e. 0 to 10) is just one example for understanding the present invention, and also their numeral values do not limit the present invention.

As shown in FIG. 6A, the controlled variable variation may be set with two values as an embodiment according to the principles of the present invention. For example, when the current slope is within a range of S1 or S3, a relatively-large controlled variable variation C_high (e.g., 10) is selected; and when the current slope is within a range of S2, a relatively-low controlled variable variation C_Low (e.g., 2) is selected. Substantially, this low controlled variable variation is selected around the maximum power point. For example, the relatively-low controlled variable variation C_Low may be selected in a range of about ±5% to about ±10% based on a current slope at the maximum power point.

As shown in FIG. 6B, the controlled variable variation may be set with step-form values as another embodiment according to the principles of in the present invention. For example, when the current slope is within a range of S1 or S3, a relatively-large controlled variable variation C_high (e.g., 10) is selected; and when the current slope is within a range between S1 and S2 or between S2 and S3, a relatively-middle controlled variable variation C_mid (e.g., 6) is selected, and when the current slope is within a range of S2, a relatively-low controlled variable variation C_Low (e.g., 2) is selected Substantially, this lowest controlled variable variation C_Low is selected around the maximum power point. For example, the relatively-low controlled variable variation C_Low may be selected in a range of about ±5% to about ±10% based on a current slope at the maximum power point.

As shown in FIG. 6C, the controlled variable variation may be set with slope form values as still another embodiment according to the principles of in the present invention. For example, when a current slope is within a range of S2, the relatively-low controlled variable variation C_Low (e.g., 2) is selected. Furthermore, if a current slope approaches 51 to S3 (i.e. out of S2), a larger controlled variable variation is selected gradually. Of course, when a current slope is S1 or S3, the relatively-large controlled variable variation C_High (e.g., 10) is selected.

Figure 7:
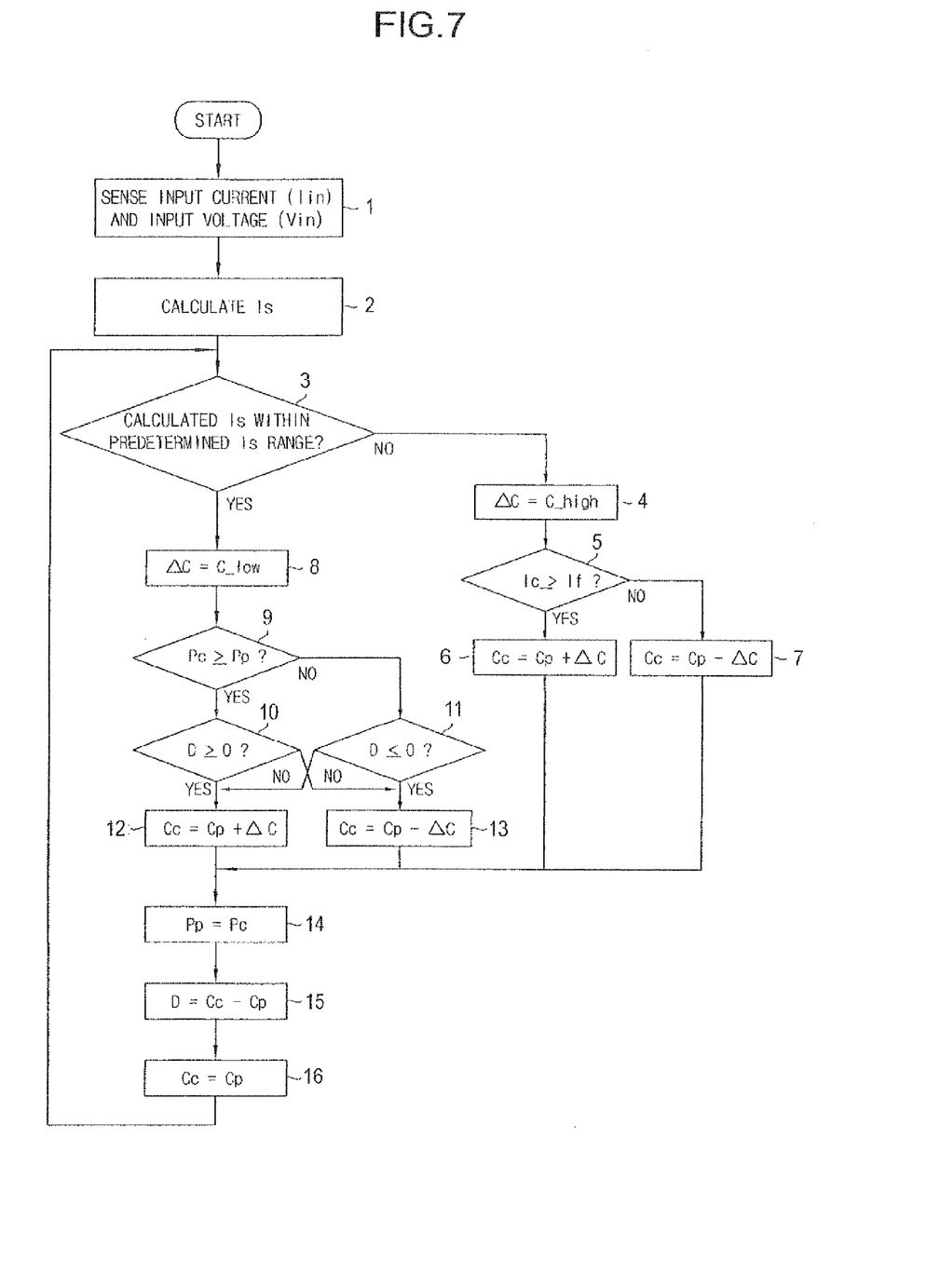
FIG. 7 is a flowchart illustrating an MPPT method of a renewable energy storage system constructed as an embodiment according to the principles of the present invention.

FIG. 7 is a flowchart illustrating an MPPT method of a renewable energy storage system according to another embodiment of the present invention.

As shown in FIG. 7, the MPPT method of a renewable energy storage system includes a sensing a current and a voltage in operation step 1, calculating a current slope in operation step 2, comparing the calculated slope of the measured current with a predetermined current slope range in operation step 3, selecting a relatively-high controlled variable variation when the slope of the measured current is out of the predetermined current slope range in operation step 4, comparing a current at the maximum power point with a present current in operation step 5, and increasing or decreasing a controlled variable using a relatively-high controlled variable variation in operation steps 6 and 7.

Additionally, the present invention also includes selecting a relatively-low controlled variable variation in operation step 8 when the slope of the measured current is within the predetermined current slope range after operation step 3, comparing a present power and a previous power in operation step 9, determining a direction of the controlled variable variation in operation steps 10 and 11, and increasing or decreasing controlled variables using a relatively-low controlled variable variation in operation steps 12 and 13.

During the sensing of the current and the voltage in operation step 1, current sensor 122a and voltage sensor 122b sense an input current $I_{in}$ and an input voltage $V_{in}$ supplied from renewable energy source 110.

During the calculating of the current slope in operation step 2, current slope comparing unit 121d calculates a current slope $I_s$ using the current sensed by current sensor 122a. This operation does not, however, limit the present invention. That is, an additional current slope calculating unit may be further included.

During the comparing the calculated slope of the measured current with a predetermined current slope range in operation step 3, it is determined whether the calculated current slope $I_s$ is within a predetermined current slope range $|I_s|$.

Here, the predetermined current slope range $|I_s|$ may be about ±1% to about ±20% of a current slope corresponding to a predetermined maximum power point. More preferably, the predetermined current slope range $|I_s|$ may be about ±5% to about ±10% of the current slope corresponding to the predetermined maximum power point. The reason for setting the current slope range $|I_s|$ in advance is that the maximum power point can be found promptly and accurately in this range. That is, when the current slope range $|I_s|$ is set less than about ±1% to about ±10%, the MPPT converter may not find the maximum power point. That is, since an operating point moves with a relatively-large controlled variable variation, for example, in FIGS. 5A through 5C, an operating point moves from the left to the right or from the right to the left infinitely using the maximum power point as the center. In addition, when the current slope range $|I_s|$ exceeds about ±10% or about ±20%, the MPPT converter may take a long time to find the maximum power point. That is, since an operating point moves with a relatively-small controlled variable variation at a distance far from the maximum power point, for example, in FIGS. 5A through 5C, it takes a too long time for an operating point to reach the maximum power point.

Moreover, if the calculated current slope $I_s$ is in the predetermined current slope range $|I_s|$, operation step 4 for selecting of the relatively-high controlled variable variation C_high is performed. That is, the controlled variable variation ΔC is determined to be equal to C_high.

In operation step 5 for comparing a current at the maximum power point with a present current, a current $I_f$ at the predetermined maximum power point is compared with a presently sensed current $I_c$.

According to a comparison result, if the presently sensed current I, is equal to or greater than the current $I_f$ at the predetermined maximum power point, operation step 6 for the increasing of the present controlled variable is performed using the relatively-high controlled variable variation C_high. That is, the present controlled variable Cc is set by adding the controlled variable variation ΔC to the previous controlled variable Cp.

On the contrary, according to a comparison result, if the presently sensed current I, is less than the current $I_f$ at the predetermined maximum power point, operation step 7 for the decreasing of the present controlled variable is performed using the relatively-high controlled variable variation C_high. That is, the present controlled variable Cc is set by subtracting the controlled variable variation ΔC from the previous controlled variable Cp.

In operations step 3 for the determining of the slope range of the calculated current, if it is determined that the calculated current slope $I_s$ is within the predetermined current slope range $|I_s|$, operation step 8 is performed. For example, operation step 8 for the selecting of the relatively low controlled variable is performed if the calculated current slope $I_s$ is within about ±1% to about ±20% of the current slope $I_f$ corresponding to the predetermined maximum power point, or if the calculated current slope $I_s$ is within about ±5% to about ±10% of the current slope $I_f$ corresponding to the predetermined maximum power point. That is, the controlled variable variation ΔC is determined to be equal to C_low.

Next, operation step 9 for the comparing of a present power with a previous power is performed. That is, power calculating unit 121a calculates present power $P_c$ using information sensed by current sensor 122a and voltage sensor 122b. Additionally, power comparing unit 121b storing a value of previous power $P_p$ compares present power $P_c$ with previous power $P_p$.

If it is determined that present power $P_c$ is greater than previous power $P_p$, operation step 10 for determining a direction D of a controlled variable variation is performed. In the present specification and the claims, a direction D of a controlled variable variation refers to a value obtained by subtracting a previous controlled variable from a present controlled variable. It is assumed that direction D of a controlled variable variation is stored in power comparing unit 121b. That is, previous power Pp and direction D of the controlled variable variation may be stored in an additional memory.

If direction D of the pre-stored controlled variable variation is equal to or greater than 0, operation step 12 for calculating a present controlled variable by adding the relatively-small controlled variable variation C_low to the previous controlled variable is performed. That is, present controlled variable Cc is set by adding controlled variable variation AC to the previous controlled variable $C_p$. Here, controlled variable variation ΔC is equal to C_low.

On the contrary, if direction D of the pre-stored controlled variable variation is less than 0, operation step 13 for calculating the present controlled variable by subtracting the relatively-small controlled variable variation C_low from the previous controlled variable is performed. That is, the present controlled variable Cc is set by subtracting controlled variable variation ΔC from previous controlled variable Cp. Likewise, controlled variable variation ΔC is equal to C_low.

In addition, if it is determined that present power $P_c$ is less than previous power $P_p$, operation step 11 for determining the direction D of the controlled variable variation is performed in the same manner.

If the direction D of the pre-stored controlled variable variation is equal to or less than 0, operation step 13 for calculating the present controlled variable by subtracting the relatively-small controlled variable variation C_low from the previous controlled variable is performed. That is, present controlled variable $C_c$ is set by subtracting controlled variable variation ΔC from previous controlled variable $C_p$. Here, controlled variable variation ΔC is equal to C_low.

On the contrary, if direction D of a pre-stored controlled variable variation is greater than 0, operation S12 for calculating a present controlled variable by adding the relatively-small controlled variable variation C_low to the previous controlled variable is performed. That is, the present controlled variable $C_c$ is set by adding controlled variable variation ΔC to previous controlled variable $C_p$. Here, controlled variable variation ΔC is equal to C_Low.

Next, present power $P_c$ is replaced with previous power $P_p$ and is stored in operation S14, direction D of the controlled variable variation is determined and stored by subtracting previous controlled variable Cp from present controlled variable Cc in operation S15. In the present specification and the pending claims, direction D of the controlled variable variation refers to a value that is obtained by subtracting previous controlled variable $C_p$ from present controlled variable $C_c$. Then previous controlled variable $C_p$ is determined to be equal to present controlled variable $C_c$ and is stored finally in operation S16. Here as mentioned above, the power, the direction of a controlled variable variation, and the controlled variable may be stored in an additional memory.

Additionally, the controlled variable variation that is divided into a relatively large value C_high and a relatively small value C_low is described in FIG. 6A according to the present invention, but this does not limit the present invention. For example, the present invention may divide the controlled variable variation by a step form as shown in FIG. 6B or by a slope form as shown in FIG. 6C such that the maximum power point can be tracked.

According to embodiments of the present invention, provided are an MPPT converter of a renewable energy storage system and an MPPT method in which prompt and accurate MPPT is possible by using a current slope of a renewable energy source such as a solar cell in MPPT.

According to embodiment of the present invention, provided are an MPPT converter of a renewable energy storage system and an MPPT method in which prompt and accurate MPPT is possible by setting a controlled variable variation to be relatively large when a current slope of a renewable energy source such as a solar cell is out of a predetermined range.

According to embodiments of the present invention, provided are an MPPT converter of a renewable energy storage system and an MPPT method in which prompt and accurate MPPT is possible by setting a controlled variable variation to be relatively small when a current slope of a renewable energy source such as a solar cell is within a predetermined range.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A maximum power point tracking (MPPT) converter of a renewable energy storage system, comprising:
   an input terminal receiving electrical power from a renewable energy source;
   an MPPT controller changing a controlled variable in proportion to a current slope of electrical current following from the renewable energy source, setting a variation of the controlled variable to a relatively large value when the current slope is without a predetermined current slope range, and setting the variation of the controlled variable to a relatively small value when the current slope is within the predetermined current slope range;
   an MPPT extractor extracting the electrical power from the renewable energy source and converting the extracted electrical power in response to the controlled variable and the variation of the controlled variable set by the MPPT controller; and
   an output terminal providing the converted electrical power to a DC link,
   said current slope defined as a ratio of a current variation divided by a corresponding time variation.

2. The MPPT converter as claimed in claim 1, wherein the predetermined current slope range extends from about ±1% to about ±20% based on a current slope corresponding to a predetermined maximum power point indicative of maximum electrical power extractable from the renewal energy source.

3. The MPPT converter as claimed in claim 1, wherein the predetermined current slope range extends from about ±5% to about ±10% based on a current slope corresponding to a predetermined maximum power point indicative of maximum electrical power extractable from the renewal energy source.

4. The MPPT converter as claimed in claim 1, wherein the MPPT controller comprises:
   a current slope range setting unit setting the predetermined current slope range as a reference for determining the controlled variable variation;
   a current slope comparing unit comparing the current slope of the electrical current flowing from the renewable energy source with the predetermined current slope range; and
   a controlled variable setting unit setting the controlled variable variation to the relatively small value when the current slope is within the predetermined current slope range.

5. The MPPT converter as claimed in claim 4, wherein the controlled variable setting unit sets the controlled variable variation to the relatively large value when the current slope is outside of the predetermined current slope range.

6. The MPPT converter as claimed in claim 4, wherein the MPPT controller comprises:
   a power calculating unit connectable to the renewable energy source to provide a determination of present by power using an input voltage and an input current provided from the renewable energy source; and
   a power comparing unit generating an output signal based upon a comparison between the present power provided from the power calculating unit with a pre-stored previous power,
   the controlled variable setting unit setting the controlled variable in response to an output signal provided from the current slope comparing unit and the power comparing unit.

7. The MPPT converter as claimed in claim 4, wherein the MPPT controller comprises:
   a Pulse Width Modulation (PWM) controlling unit electrically connected to the control variable setting unit and generating a PWM signal determined by an output signal of the control variable setting unit and an output current of the MPPT converter; and
   a gate signal generating unit electrically connected to the PWM controlling unit to provide a gate signal representative of the PWM signal,
   the MPPT extractor operationally responding to the gate signal provided by the gate signal generating unit.

8. The MPPT converter as claimed in claim 1, wherein the MPPT extractor is a non-insulating DC-DC converter.

9. The MPPT converter as claimed in claim 1, wherein the MPPT extractor is an insulating DC-DC converter.

10. The MPPT converter as claimed in claim 1, wherein the renewable energy source is a solar cell.

11. A maximum power point tracking (MPPT) method of a renewable energy storage system, the method comprising:
    sensing an input current and an input voltage provided from a renewable energy source;
    determining a current slope from the input current;
    determining whether the current slope is within a predetermined current slope range or not;
    setting a variation of a controlled variable to be a relatively small value when the current slope is determined to be within the predetermined current slope range, the controlled variable variation being used for maximum power extraction from the renewable energy source;
    setting the variation of the controlled variable to be a relatively large value when the current slope is determined to be not within the predetermined current slope range; and
    providing a signal to control a power converter in response to the variation of the controlled variable,
    said current slope defined as a ratio of a current variation divided by a corresponding time variation.

12. The MPPT method as claimed in claim 11, wherein the predetermined current slope range extends from about ±1% to about ±20% of a current slope corresponding to a predetermined maximum power point.

13. The MPPT method as claimed in claim 11, wherein the predetermined current slope range extends from about ±5% to about ±10% of a current slope corresponding to a predetermined maximum power point.

14. The MPPT method as claimed in claim 11, after the setting of the variation of the controlled variable to be the relatively large value, further comprising:
   determining whether a presently sensed current value is equal to or greater than a current value corresponding to a predetermined maximum power point; and
   setting a present controlled variable by adding the variation of the controlled variable to a previous controlled variable when the presently sensed current value is equal to or greater than the current value corresponding to the predetermined maximum power point.

15. The MPPT method as claimed in claim 11, after the setting of the controlled variable variation to be the relatively large value, further comprising:
   determining whether a presently sensed current value is equal to or greater than a current value corresponding to a predetermined maximum power point; and
   setting a present controlled variable by subtracting the variation of the controlled variable from a previous controlled variable when the presently sensed current value is less than the current value corresponding to the predetermined maximum power point.

16. The MPPT method as claimed in claim 11, after the setting of the controlled variable variation to be the relatively small value, further comprising:
   determining whether a present power is equal to or greater than a previous power; and
   setting a present controlled variable by adding the variation of the controlled variable to a previous controlled variable when the present power is equal to or greater than the previous power and a direction of the variation of the controlled variable is equal to or greater than 0.

17. The MPPT method as claimed in claim 11, after the setting of the controlled variable variation to be the relatively small value, further comprising:
   determining whether a present power is equal to or greater than a previous power; and
   setting a present controlled variable by subtracting the variation of the controlled variable from a previous controlled variable when the present power is equal to or greater than the previous power and a direction of the variation of the controlled variable is less than 0.

18. The MPPT method as claimed in claim 11, after the setting of the controlled variable variation to be the relatively small value, further comprising:
   determining whether a present power is equal to or greater than a previous power; and
   setting a present controlled variable by subtracting the controlled variable variation from a previous controlled variable when the present power is less than the previous power and a direction of the variation of the controlled variable is equal to or less than 0.

19. The MPPT method as claimed in claim 11, after the setting of the controlled variable variation to be the relatively small value, further comprising:
   determining whether a present power is equal to or greater than a previous power; and
   setting a present controlled variable by adding the controlled variable variation to a previous controlled variable when the present power is less than the previous power and a direction of the controlled variable variation is greater than 0.

20. The MPPT method as claimed in claim 11, wherein the renewable energy source is a solar cell.

* * * * *